United States Patent [19]

Yoshikawa

[11] Patent Number: 5,357,558
[45] Date of Patent: Oct. 18, 1994

[54] RADIO COMMUNICATION APPARATUS FOR ISDN

[75] Inventor: Munehiro Yoshikawa, Tokyo, Japan

[73] Assignee: Sony Corporation, Tokyo, Japan

[21] Appl. No.: 826,001

[22] Filed: Jan. 27, 1992

[30] Foreign Application Priority Data

Jan. 31, 1991 [JP] Japan ................................. 3-010550

[51] Int. Cl.$^5$ ........................................... H04M 11/00
[52] U.S. Cl. ...................................... 379/58; 379/61; 379/233; 370/110.1
[58] Field of Search .................... 379/58, 61, 63, 208, 379/210, 211, 212, 213, 233; 370/110.1

[56] References Cited

U.S. PATENT DOCUMENTS

| | | | |
|---|---|---|---|
| 4,958,153 | 9/1990 | Murata et al. | 379/208 X |
| 4,975,941 | 12/1990 | Morganstein et al. | 379/212 X |
| 5,099,511 | 3/1992 | Matsumoto | 379/233 X |
| 5,189,695 | 2/1993 | Maei | 379/110.1 X |
| 5,200,994 | 4/1993 | Sasano et al. | 379/142 |
| 5,233,648 | 8/1993 | Nakamura | 379/233 |
| 5,291,549 | 3/1994 | Izumi | 379/233 |

FOREIGN PATENT DOCUMENTS 3843870 6/1990 Fed. Rep. of Germany ........ 379/61

Primary Examiner—Curtis Kuntz
Assistant Examiner—G. J. Oehling
Attorney, Agent, or Firm—Limbach & Limbach

[57] ABSTRACT

A radio communication apparatus includes a main telephone connected to a digital line network and a plurality of sub telephones each being capable of performing a radio communication to the main telephone. The main telephone includes a memory for storing a subaddress and a direct dial-in number of each of the plurality of sub telephones, and an unit for, upon receiving an incoming signal transmitted from the digital line network, detecting a subaddress or a direct dial-in number included in the incoming signal, discriminating a sub telephone associated with the detected subaddress or direct dial-in number in accordance with the data stored in the memory, and transmitting the incoming signal to the discriminated sub telephone.

4 Claims, 5 Drawing Sheets

| | Terminal ID | Subaddress | DDI | Attribute Data |
|---|---|---|---|---|
| Master Station | 0000 | 123401 | — | — — — — — |
| 1st Remote Station | 0001 | 23 | — | — — — — — |
| 2nd Remote Station | 0002 | 31 | — | — — — — — |
| 3rd Remote Station | 0003 | 32 | 1234 | — — — — — |
| 4th Remote Station | 0004 | 104 | 1222 | — — — — — |
| 5th Remote Station | 0005 | 301 | — | — — — — — |

| | Terminal ID | Subaddress | DDI | Attribute Data |
|---|---|---|---|---|
| Master Station | 0000 | 1 2 3 4 0 1 | — | ------ |
| 1st Remote Station | 0001 | 2 3 | — | ------ |
| 2nd Remote Station | 0002 | 3 1 | — | ------ |
| 3rd Remote Station | 0003 | 3 2 | 1 2 3 4 | ------ |
| 4th Remote Station | 0004 | 1 0 4 | 1 2 2 2 | ------ |
| 5th Remote Station | 0005 | 3 0 1 | — | ------ |

RADIO COMMUNICATION APPARATUS FOR ISDN

BACKGROUND OF THE INVENTION

1. Field of the Invention

The present invention generally relates to a communication apparatus and, more particularly, is directed to a radio communication apparatus suitably to be applied to a cordless telephone connected to a digital line network such as an ISDN (an Integrated Services Digital Network) and so on.

2. Description of the Related Art

Recently, there have been utilized various types of cordless telephones which are movable freely and able to perform a communication within a predetermined service area, e.g., a radius of about 100 m. The cordless telephone is constituted by a master station directly connected to a telephone line network and a remote station carried by a user so that a radio communication is performed between the master station and the remote station. Some types of the cordless telephones can provide a plurality of remote stations which are able to communicate with a single master station.

FIG. 1 shows an arrangement of an example of conventional cordless telephones connected to a general telephone line network. In this example, three remote stations 7 to 9 are utilized and a telephone line network interface 3 of a master station 2 is connected to an end terminal of an analog telephone line network 1. The master station 2 further includes a radio transceiver 4 connected to the telephone line network interface 3 and a controller 5 for controlling the processings of the interface 3 and the radio transceiver 4.

Namely, under the control of the controller 5, a signal transmitted from a central telephone exchange or office side through the telephone line network 1 is received by the telephone line network interface 3 and then modulated by the radio transceiver 4 to obtain a modulated signal of a predetermined channel for radio transmission. The modulated signal is transmitted as a radio signal through an antenna 6 to the first to third remote stations 7 to 9. Each of the first to third remote stations 7 to 9 is provided with a speaker and a microphone for a speech and a dial keypad, etc. The remote stations 7, 8 and 9 receive the radio signal transmitted from the master station 2 by antennas 7a, 8a and 9a connected thereto, respectively, and each remote station has a circuit configuration for discriminating whether or not the radio signal designates itself on the basis of a control signal contained in the radio signal. If the remote station discriminates that the radio signal designates itself, the remote station performs a receiving processing of the radio signal to reproduce a voice signal from its speaker.

Each of the remote stations 7, 8 and 9 detects a voice signal by its microphone and modulates the detected voice signal by a circuit configuration provided therein to obtain a modulated signal for a radio transmission, thereby transmitting the modulated signal from its antennas 7a, 8a or 9a. In the master station 2, the modulated signal transmitted from the remote station is received by the radio transceiver 4 through the antenna 6 and then transmitted to the telephone line network 1 through the telephone line network interface 3. In this manner, a so-called line wire speech can be performed by any of the remote stations 7, 8 and 9 through the master station 2.

Further, each of the remote stations 7 to 9 can transmit a radio signal to the master station with the designation of another remote station, thereby enabling a speech among the respective remote stations, that is, an extension speech.

As one of telephone line networks, a digital line network called ISDN has been started to be serviced. By utilizing the ISDN, various kinds of data can be transmitted effectively and further various controls such as the designation of a terminal receiving an incoming signal or the like can be performed. That is, a desired one of plural terminals commonly connected to one line at the respective subscriber sides can be called by designating the desired terminal through the use of a subaddress or a direct dial-in number (DDI number), etc.

However, in case of connecting a telephone provided in a home to the ISDN, an ISDN telephone is required. That is, in case of connecting the above-described cordless telephone to the ISDN, for example, the telephone line network interface 3 is required to be replaced by the ISDN interface, whereby a speech can be performed through the ISDN at least in each of the remote stations 7 to 9.

However, in case of the cordless telephone, even if the telephone line network interface 3 is replaced by the ISDN interface, there can not get services such as the above-described designation of a terminal capable in the ISDN. That is, unless each of the remote stations 7 to 9 is provided with a circuit for discriminating a subaddress or the DDI number of the ISDN etc., it can not get services such as the designation of a terminal but merely can perform a speech similar to that capable through the use of the normal analog telephone line network, so that the ISDN can not be utilized effectively.

If each of the remote stations is implemented with the ISDN call sequence, the constructions of the remote station become more complicated, then the constructions of a system of the cordless telephone become larger disadvantageously. Further, the similar problem is found when, to the ISDN, there is connected a telephone in which a plurality of remote stations are connected to a master station through signal lines other than the cordless telephone.

OBJECTS AND SUMMARY OF THE INVENTION

It is an object of the present invention to provide an improved radio communication apparatus for an ISDN in which the aforementioned shortcomings and disadvantages encountered with the prior art can be eliminated.

More specifically, it is an object of the present invention to provide a radio communication apparatus for an ISDN having a plurality of remote stations such as a cordless telephone which can get services of the digital line network such as the ISDN with simple circuit configurations.

As an aspect of the present invention, a radio communication apparatus including a main telephone connected to a digital line network and a plurality of sub telephones each being capable of performing a radio communication to the main telephone, the main telephone is comprised of a memory for storing a subaddress and a direct dial-in number of each of the plurality of sub telephones, and a unit for, upon receiving an incoming signal transmitted from the digital line network, detecting a subaddress or a direct dial-in number included in the incoming signal, discriminating a sub telephone associated with the detected subaddress or direct dial-in number in accordance with the data stored in the memory, and transmitting the incoming signal to the discriminated sub telephone.

According to the radio communication apparatus for an ISDN of the present invention, when, to a digital line network such as the ISDN, there is connected a radio communication apparatus such as a cordless telephone wherein a radio communication is performed between a main telephone and sub telephones, the sub telephones can be controlled at the main telephone side in accordance with a subaddress or a DDI number included in an incoming signal. Accordingly, the radio communication apparatus can obtain services such as the selection of a terminal receiving an incoming signal without detecting a subaddress or a DDI number of the incoming signal at each of the sub telephones, so that the constructions of each of the sub telephones can be simplified.

The preceding and other objects, features, and advantages of the present invention will become apparent from the following detailed description of illustrative embodiment thereof when read in conjunction with the accompanying drawings, in which like reference numerals are used to identify the same or similar parts in the several views.

DESCRIPTION OF THE PREFERRED EMBODIMENTS

An embodiment of a radio communication apparatus for an ISDN according to the present invention will now be described with reference to FIGS. 2 to 6, in which case the present invention is applied to a cordless telephone connected to the ISDN.

Figure 2:
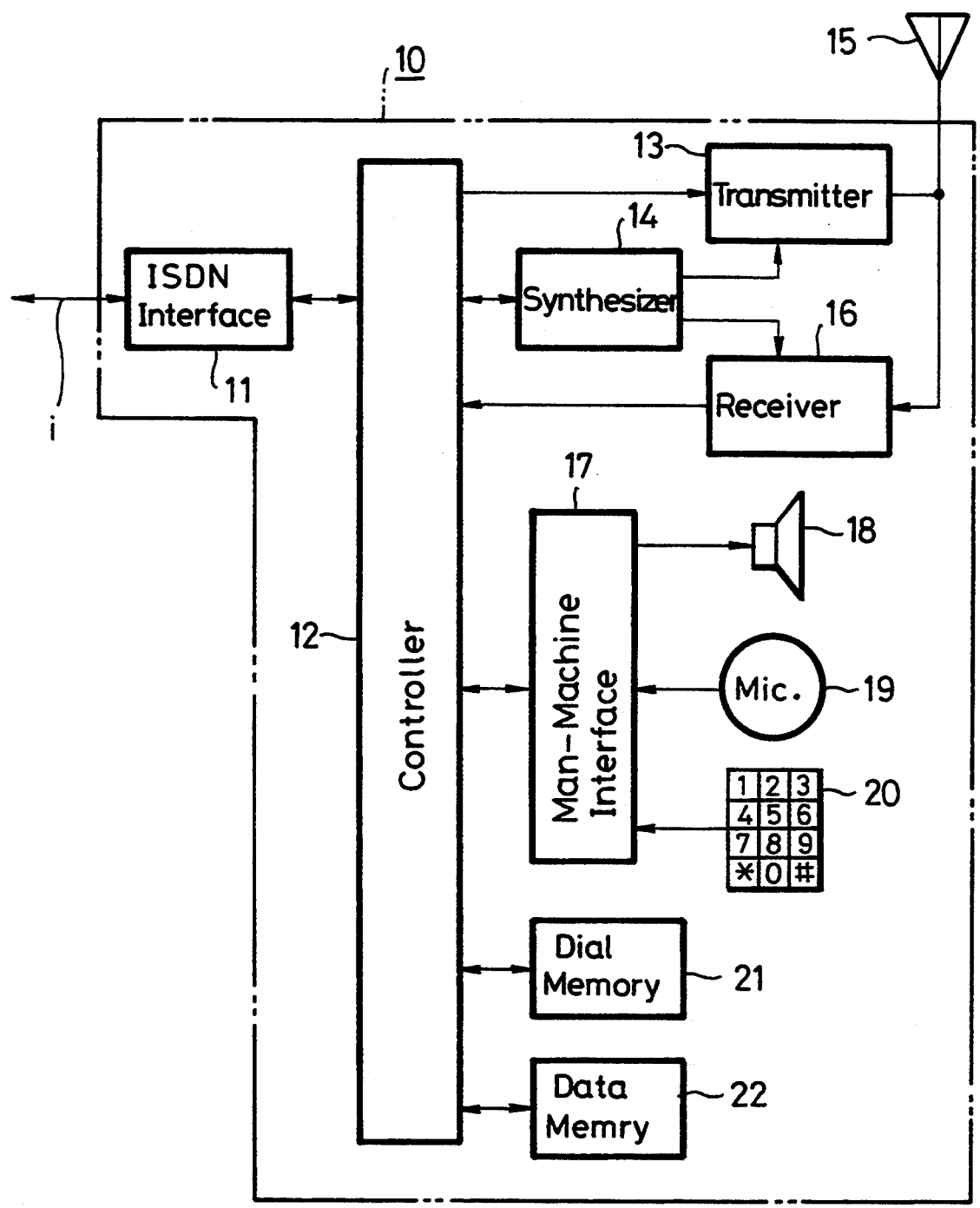
FIG. 2 shows in block form an arrangement of an embodiment of a master station of a cordless telephone according to the present invention.

FIG. 2 shows an arrangement of a master station 10 of the embodiment of a cordless telephone, in which the master station 10 is connected to an ISDN line network i. Namely, an end terminal of the ISDN line network i is connected to an ISDN interface 11 of the master station 10 of the cordless telephone. The ISDN interface 11 receives an incoming signal transmitted from a central telephone exchange side through the line network i and supplies the incoming signal to circuit arrangements within the master station 10 necessary for processing the incoming signal. Further, the ISDN interface 11 converts an outgoing signal supplied from a circuit arrangement within the master station 10 into an outgoing signal for the ISDN and thereby transmits it to the ISDN line network i. In this case, a controller 12 of the master station 10 is connected to the ISDN interface 11 and under the control of the controller 12, the incoming and outgoing signals are processed. At that time, when an audio signal is converted into digital data and then transmitted from the master station 10 to the ISDN line network i, the ISDN interface 11 converts the digital data into an analog audio signal. While, when an analog audio signal is supplied to the ISDN line network i from the master station 10, the ISDN interface 11 converts the same into digital data to form an outgoing signal.

In the master station 10, a transmitter 13 is supplied with a signal to be transmitted to a remote station, which will be described later, from the controller 12 and modulates it by a signal of a predetermined frequency supplied from a frequency synthesizer 14 to generate a modulated signal with a predetermined frequency (a predetermined transmission channel), thereby transmitting the modulated frequency signal through an antenna 15 to a predetermined remote station as a radio frequency signal. The antenna 15, on the other hand, receives a radio frequency signal transmitted from a remote station and supplies it to a receiver 16. The receiver 16 demodulates the radio frequency signal of the predetermined transmission channel in accordance with the signal with a predetermined frequency supplied from the frequency synthesizer 14.

To the controller 12, there are connected a speaker 18, a microphone 19 and a dial keypad 20 through a man-machine interface 17. The speaker 18 and microphone 19 constitute a handset, and the transmission operation and so on can be performed by the dial keypad 20 so that a speech utilizing the ISDN line network i can be performed only by the master station 10.

To the controller 12, there is also connected a dial memory 21 and a data memory 22. The dial memory 21 stores data of abbreviated dial numbers which are used upon transmitting by the operation of the dial keypad 20 etc. The data memory 22 stores data related to the respective remote stations such as direct dial-in numbers, subaddresses and attribute data or the like set to the respective remote stations. These respective data are required for performing various services capable by the ISDN as explained below.

The DDI (direct dial-in) numbers are dedicated dial numbers set for the respective remote stations which are provided separately from dial numbers set for respective users, so that, by performing the transmitting operation by using the DDI number, only one remote station designated thereby can be called. The subaddresses are peculiar numbers set for the respective remote stations, so that, upon transmitting, by inputting the subaddress subsequent to the dial number set for the user, only the remote station designated thereby can be called. The attribute data are data representing attributes of the respective remote stations or devices connected thereto. For example, the attribute data represents kinds of the remote stations such as a remote station capable of a normal speech, that capable of a speech of a high-quality audio signal, that connected to a facsimile device, that connected to a videotex terminal or that connected to a telex terminal. The attribute data further includes various data related to lower layer and higher layer matchings or the like which are stored in the memory 22.

Figures 1, 3:
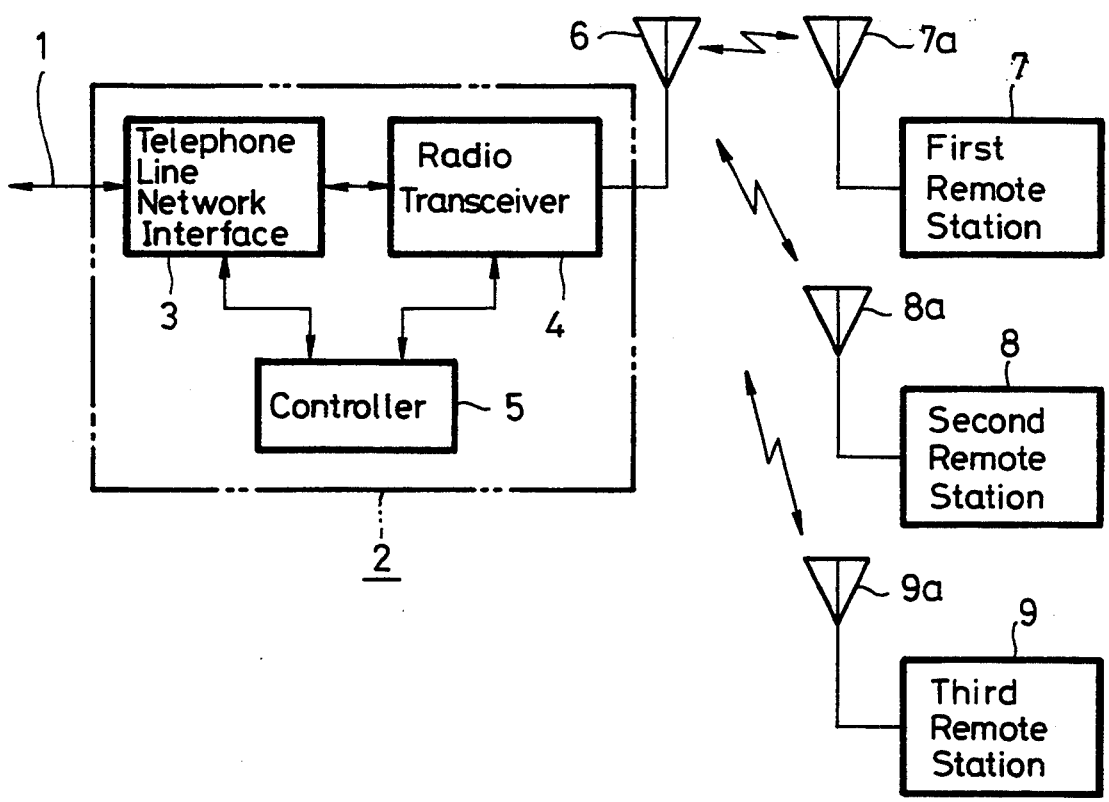
FIG. 1 shows in block form an arrangement of an example of conventional cordless telephones.
FIG. 3 shows a schematic diagram of an example of data stored in the data memory used in the above embodiment.

These data are stored in the data memory 22 in a manner as shown in FIG. 3. Referring to FIG. 3, terminal identifiers (IDs) are allocated to the master station and the remote stations of the cordless telephone of this embodiment, respectively, and storage areas are provided for each of the terminal IDs for storing the subaddresses, DDI numbers and attribute data. In this example, the DDI numbers are set only for terminals registered at the central telephone exchange side.

When a DDI number, a subaddress and attribute data etc. are set for the master station, these data are also stored in the data memory 22. Further, when there are other data required for performing various services capable by the ISDN, these data are also stored in the data memory 22.

Figure 4:
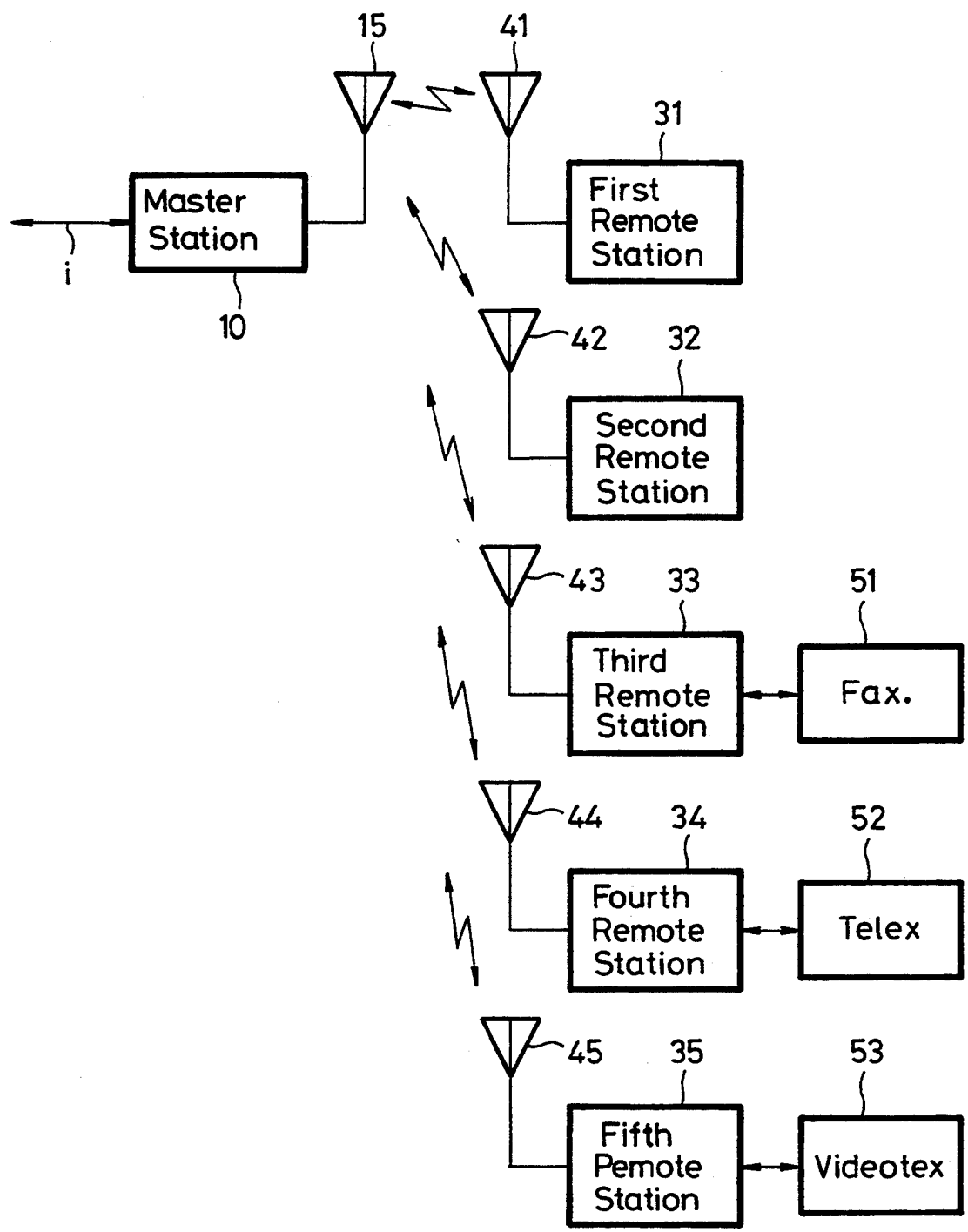
FIG. 4 shows in block form an arrangement of the embodiment of the system of the cordless telephone.

FIG. 4 shows an arrangement of the total system of the cordless telephone of this embodiment, wherein five remote stations 31 to 35 are provided for one master station 10 so that a radio communication is performed between the antenna 15 of the master station 10 and each of antennas 41 to 45 of the remote stations 31 to 35. In this example, each of the first and second remote stations 31 and 32 serves as a telephone capable of a speech using a normal voice and has a speaker and a microphone constituting a handset and a dial keypad. The third remote station 33 is connected with a facsimile terminal 51 so that the reception and transmission of a document is possible. The fourth remote station 34 is connected with a telex terminal 52 so that the transmission and reception of character data or the like are possible. Further, the fifth remote terminal 35 is connected with a videotex terminal 53 so that the transmission and reception of picture data and so on are possible. The data related to signals dealt with by these remote stations are previously stored in the data memory 22. When one of the remote stations 31 and 32 is a telephone capable of a speech of high-quality voice, of which data is also stored in the data memory 22.

Operation of the thus constituted cordless telephone will be described in a case where an incoming signal is transmitted thereto through the ISDN line network i. An ISDN incoming signal includes various kinds of call setup messages. These call setup messages are discriminated by the ISDN interface 11 and the results of the discrimination are supplied to the controller 12. The discrimination operation will be explained with reference to a flowchart forming FIG. 5.

Figure 5:
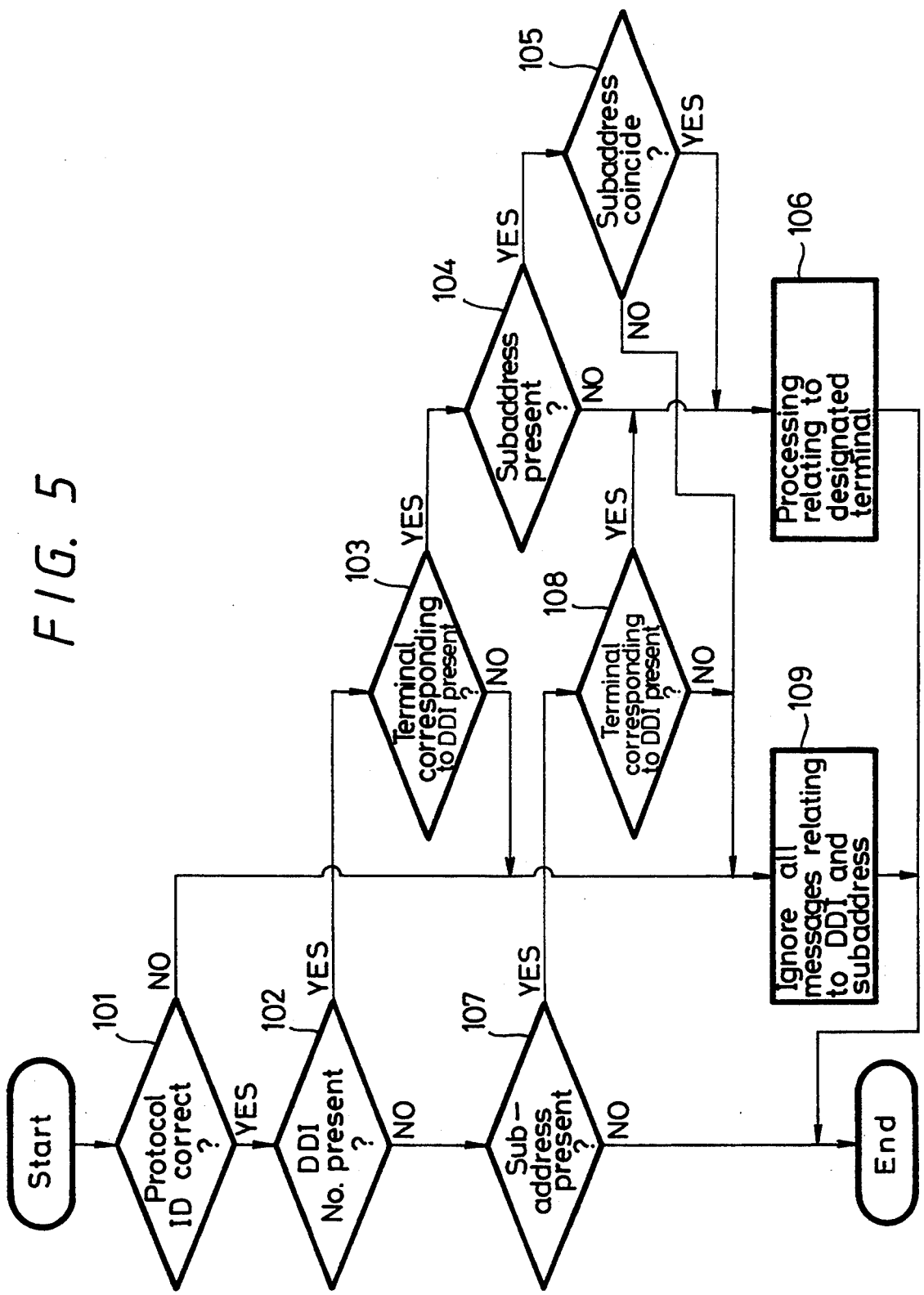
FIG. 5 is a flowchart to which references will be made in explaining operation of the master station shown in FIG. 2.

Referring to FIG. 5, following the Start of operation, a protocol identifier of the incoming signal is checked by the ISDN interface 11 in step 101. If the protocol identifier is discriminated correctly as represented by a YES at decision step 101, then the controller 12 judges whether or not the messages include a DDI number (incoming number) in step 102. If the messages include a DDI number as represented by a YES at step 102, then the processing proceeds to the next decision step 103.

In step 103, the controller 12 judges whether or not there is a remote station (terminal device) to which the DDI number designated by the messages is set in accordance with the data stored in the data memory 22. If there is a remote station (that is, one of the first to fifth remote stations 31 to 35) corresponding to the DDI number as represented by a YES at decision step 103, then the controller 12 judges whether or not the messages designate a subaddress in step 104. If the messages designate a subaddress as represented by a YES at step 104, then the processing proceeds to the next decision step 105.

In step 105, the controller 12 detects a remote station (terminal device) to which the subaddress designated by the messages is set in accordance with the data stored in the data memory 22 and further Judges whether or not the detected remote station is same as that designated by the DDI number.

If the detected remote station is the same as that designated by the DDI number as represented by a YES at decision step 105, then the processing proceeds to the next step 106.

In step 106, the controller 12 determines that the incoming signal is to be transmitted to the remote station designated by the DDI number and the subaddress, thereby transmitting a call accept request to the designated remote station as a radio wave when an attribute designated by the messages coincides with that of the designated remote station as described below. If the receiving operation is performed at the designated remote station in response to the call accept request, the controller 12 transmits an incoming signal subjected to a predetermined processing to the designated remote station, thereby executing a receiving procedure of the incoming signal at the remote station.

If the messages do not designate a subaddress as represented by a NO at step 104, then the processing also proceeds to step 106. In step 106, the controller 12 transmits a call accept request to the remote station designated by the DDI number as a radio wave when an attribute designated by the messages coincides with that of the designated remote station as described below. If the receiving operation is performed at the designated remote station in response to the call accept request, the controller 12 transmits an incoming signal subjected to the predetermined processing to the designated remote station, thereby executing a receiving procedure of the incoming signal at the designated remote station.

If the messages do not include a DDI number as represented by a NO at step 102, then the processing proceeds to step 107, whereat the controller 12 determines whether or not the messages designate a subaddress. If the messages designate a subaddress as represented by a YES at step 107, then the controller 12 determines whether or not there is a remote station (terminal device) to which the subaddress designated by the messages is set in accordance with the data stored in the data memory 22 in step 108. If there is a remote station to which the subaddress designated by the message is set as represented by a YES at decision step 108, then the processing proceeds to the next step 106.

In step 106, the controller 12 transmits a call accept request to the remote station designated by the subaddress as a radio wave when an attribute designated by the messages coincides with that of the designated remote station as described below. If the receiving operation is performed at the designated remote station in response to the call accept request, the controller 12 transmits an incoming signal subjected to the predetermined processing to the designated remote station, thereby executing a receiving procedure of the incoming signal at the designated remote station.

Further, if the protocol identifier is not discriminated correctly as represented by a NO at decision step 101, if there is not a remote station corresponding to the DDI number as represented by a NO at decision step 103, if the detected remote station is not same as that designated by the DDI number as represented by a NO at decision step 105, or if there is not a remote station to which the subaddress designated by the message is set as represented by a NO at decision step 108, then the processing proceeds to the next step 109.

In step 109, all messages relating to the DDI number and the subaddress used for the judgements in steps 101, 103, 105 and 108 are ignored.

After the messages have been processed with respect to the DDI number and the subaddress, when the remote station designated by the DDI number and/or the subaddress is detected and the processing proceeds to step 106 as described above, the controller 12 determines whether or not the attribute designated by the messages coincides with that of the designated remote station. Only when the attribute designated by the messages coincides with that of the designated remote station, the receiving operation of an incoming signal is performed at the designated remote station.

Operation of the controller 12 with respect to the attributes will be described with reference to a flowchart forming FIG. 6.

Figure 6:
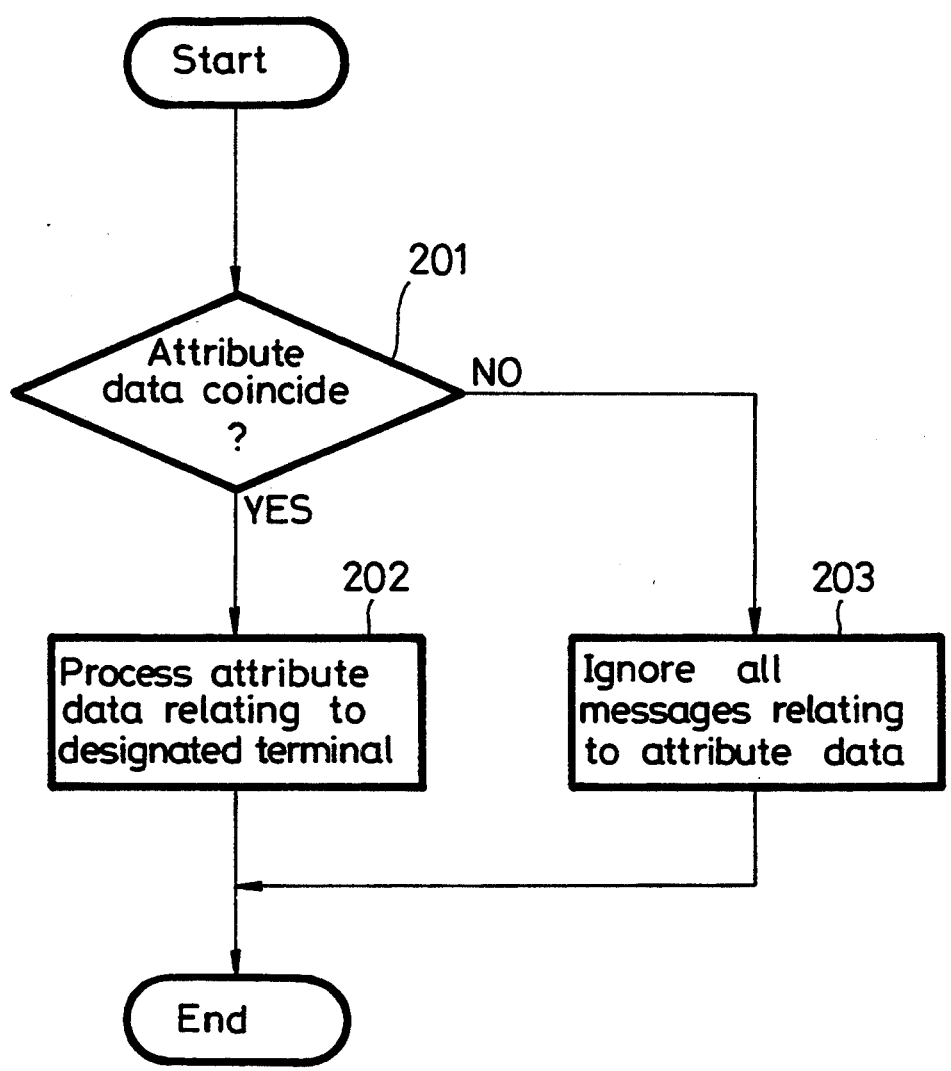
FIG. 6 is a flowchart to which references will be made in explaining discrimination operation of an attribute in the master station in FIG. 2.

Referring to FIG. 6, following the Start of operation, the processing proceeds to decision step 201. In step 201, the controller 12 discriminates an attribute from the messages of the incoming signal, and determines whether or not the attribute designated by the messages coincides with that of the remote station designated by the DDI number and/or the subaddress of the messages. For example, the controller 12 determines whether or not the transmission ability of the designated remote station coincides with the incoming signal, or whether or not the attribute of layer matching such as the lower layer matching and the higher layer matching coincides with that of the incoming signal.

If the attribute designated by the messages coincides with that of the designated remote station as represented by a YES at decision step 201, then the controller 12 processes the attribute relating to the designated remote station or terminal in the next step 202.

If the attribute designated by the messages does not coincide with that of the designated remote station as represented by a NO at decision step 201, then the controller 12 ignores all messages relating to the attribute in step 203.

Now, even when all messages relating to the DDI number and the subaddress are ignored in step 109, the controller 12 discriminates an attribute of the messages of the incoming signal similarly, and determines whether or not there is a remote station whose attribute coincides with the attribute designated by the messages. In this case, if there is a remote station whose attribute coincides with the attribute designated by the messages, the controller 12 performs the processing with respect to this remote station.

That is, the controller 12 transmits a call accept request to the remote station whose attribute coincides with that designated by the messages. Then, when the receiving operation is performed at the remote station in response to the call accept request, the controller 12 transmits an incoming signal subjected to the predetermined processing to the remote station, thereby executing a receiving procedure of the incoming signal at the remote station. For example, when the messages of the incoming signal do not designate any one of the DDI number and the subaddress but designates only an attribute representing a facsimile signal, for example, the controller 12 transmits the incoming signal to only the third remote station 33 to which the facsimile terminal 51 is connected.

As describe above, according to the cordless telephone of this embodiment, although the ISDN interface 11 is provided only for the master station 10, various services capable by the ISDN can be performed at each of the remote stations 31 to 35. That is, if an incoming signal includes messages relating to a DDI number and a subaddress or messages relating to an attribute, the master station 10 performs the processings relating to the messages in accordance with data stored in the data memory 22 provided in the master station 10. Then, each of the remote stations can perform the processings relating to the messages without discriminating the messages, so that the arrangement of a cordless telephone connected to the ISDN line network can be simplified. In this case, since only one ISDN interface 11 may be provided in the master station 10 regardless of the number of the remote stations, the arrangement of the cordless telephone can be more simplified when compared with the conventional ones in the case where the number of the remote stations is large. Further, since each of the remote stations is not required to perform the processings relating to the ISDN nor to store the DDI number and the subaddress, remote stations of the cordless telephone for use in widely spread analog telephone line network can be utilized directly as the remote stations of this embodiment. For example, in case of connecting a cordless telephone for the analog telephone line network provided in the home to the ISDN line network, the services of the ISDN can be provided by merely substituting a master station for the ISDN for that of the analog telephone network. Accordingly, the cordless telephone of this embodiment can be used widely.

While the embodiment has been described about a case where an incoming signal is received by the respective remote stations, it will be readily apparent that the various services capable by the ISDN can be performed in the master station in case of receiving an incoming signal by the handset having the speaker 18 and the microphone 19 which are connected to the controller 12 through the man-machine interface 17.

Further, although the embodiment has been described with respect to the processings of an incoming signal, the cordless telephone of this embodiment may be modified such that, upon transmitting an outgoing signal, the master station 10 can perform various processings associated with the ISDN. For example, the ISDN interface 11 may prepare messages to be added to an outgoing signal on the basis of the data stored in the data memory 22 under the control of the controller 12 and then transmit the outgoing signal to the ISDN line network i. In this case, the messages include an attribute of the originating remote station from which the outgoing signal was transmitted, a DDI number and a subaddress of the remote station, and a subaddress designated by the remote station etc. That is, in case of adding an attribute and a subaddress of the originating remote station to the messages, the controller 12 discriminates the originating remote station, then reads data relating to the originating remote station from the data memory 22 to discriminate an attribute and a subaddress thereof, thereby adding the discriminated attribute and subaddress to the messages.

As set out above, according to this invention, when, to a digital line network such as the ISDN, there is connected a radio communication apparatus such as a cordless telephone wherein a radio communication is performed between a main telephone and sub telephones, the sub telephones can be controlled at the main telephone side in accordance with a subaddress or a DDI number included in an incoming signal. Accordingly, the radio communication apparatus can obtain services such as the selection of a terminal receiving an incoming signal without detecting a subaddress or a DDI number of the incoming signal at each of the sub telephones, so that the constructions of each of the sub telephones can be simplified.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is.

1. A radio communication apparatus for providing radio communication between a digital line network and a plurality of sub telephones, the apparatus comprising:

memory means for storing a subaddress and a direct dial-in number for each of the plurality of sub telephones;

receiving means for receiving an incoming signal transmitted from the digital line network;

first discriminating means for determining when the incoming signal has a direct dial-in number included in the incoming signal and for comparing the direct dial-in number of the incoming signal to the direct dial-in numbers stored in the memory means when the incoming signal has a direct dial-in number;

second discriminating means for determining when the incoming signal has a subaddress included in the incoming signal and for comparing the subaddress of the incoming signal to the subaddresses stored in the memory means when the incoming signal has a subaddress; and transmitting means for transmitting the incoming signal to a discriminated sub telephone having at least one of a direct dial-in number and a subaddress that matches a respective one of a direct dial-in numbers and a subaddresses in the incoming signal.

2. A radio communication apparatus according to claim 1 wherein the memory means further stores attribute data for each of the plurality of sub telephones, and wherein the apparatus further comprises third discriminating means for determining when the incoming signal includes attribute data, and for comparing the attribute data of the incoming signal to the attribute data stored in the memory means when the incoming signal has attribute data, wherein the transmitting means transmits the incoming signal to a discriminated sub telephone having at least one of a direct dial-in number and a subaddress, and attribute data that matches a respective one of a direct dial-in number and a subaddress, and attribute data of the incoming signal.

3. A radio communication apparatus according to claim 1 and further comprising means for discriminating an originating sub telephone when the originating sub telephone transmits an outgoing signal, reading the subaddress or the direct dial-in number of the originating sub telephone from the data stored in the memory means, and for adding the subaddress or the direct dial-in number of the originating sub telephone to the outgoing signal.

4. The radio communication apparatus according to claim 2 and further comprising means for directing the incoming signal to a sub telephone which has attribute data that matches the attribute data of the incoming signal when the attribute data of the discriminated sub telephone does not match the attribute data of the incoming signal.

* * * * *